United States Patent
Miller et al.

(10) Patent No.: US 8,596,986 B2
(45) Date of Patent: Dec. 3, 2013

(54) UNFLARED COMPRESSOR BLADE

(75) Inventors: Edward Len Miller, Jupiter, FL (US);
William David Day, Jupiter, FL (US);
Hitesh Narendra Patel, Palm Beach Gardens, FL (US); Jeffrey S. Taylor, Stuart, FL (US)

(73) Assignee: Alstom Technology Ltd., Baden (CH)

( * ) Notice: Subject to any disclaimer, the term of this patent is extended or adjusted under 35 U.S.C. 154(b) by 511 days.

(21) Appl. No.: 13/032,912

(22) Filed: Feb. 23, 2011

(65) Prior Publication Data
US 2012/0213631 A1    Aug. 23, 2012

(51) Int. Cl.
*F01D 5/14* (2006.01)
*F04D 29/38* (2006.01)

(52) U.S. Cl.
USPC ........................ 416/243; 416/DIG. 2

(58) Field of Classification Search
USPC ............. 416/223 A, 214 R, 242, 243, DIG. 2
See application file for complete search history.

(56) References Cited

U.S. PATENT DOCUMENTS

| | | | |
|---|---|---|---|
| 7,494,322 B2 * | 2/2009 | Spracher et al. | 416/223 A |
| 7,494,323 B2 * | 2/2009 | Douchkin et al. | 416/223 A |
| 7,524,170 B2 * | 4/2009 | Devangada et al. | 416/223 A |
| 7,530,793 B2 * | 5/2009 | Huskins et al. | 416/223 A |
| 7,534,092 B2 * | 5/2009 | Columbus et al. | 416/223 A |
| 2008/0101954 A1 | 5/2008 | Latimer | |
| 2008/0273984 A1 | 11/2008 | Liang | |
| 2009/0162204 A1 | 6/2009 | Aggarwala | |
| 2009/0290987 A1 * | 11/2009 | Parker et al. | 416/241 R |

OTHER PUBLICATIONS

U.S. Appl. No. 12/175,822, filed Jul. 18, 2008.
International Search Report and Written Opinion of PCT/US2012/026302; filed Feb. 23, 2012.

* cited by examiner

*Primary Examiner* — Nathaniel Wiehe
*Assistant Examiner* — Su Htay
(74) *Attorney, Agent, or Firm* — Shook, Hardy & Bacon L.L.P.

(57) ABSTRACT

A compressor component having an airfoil with a profile in accordance with Table 1 is disclosed. The compressor component, such as a compressor blade, has an increased thickness over a portion of the airfoil span in order to increase stiffness. Furthermore, the airfoil has been restacked so as to induce a compressive stress in the blade root/attachment area. The increased stiffness and restacked airfoil combine to improve high-cycle fatigue capability of the compressor component.

15 Claims, 5 Drawing Sheets

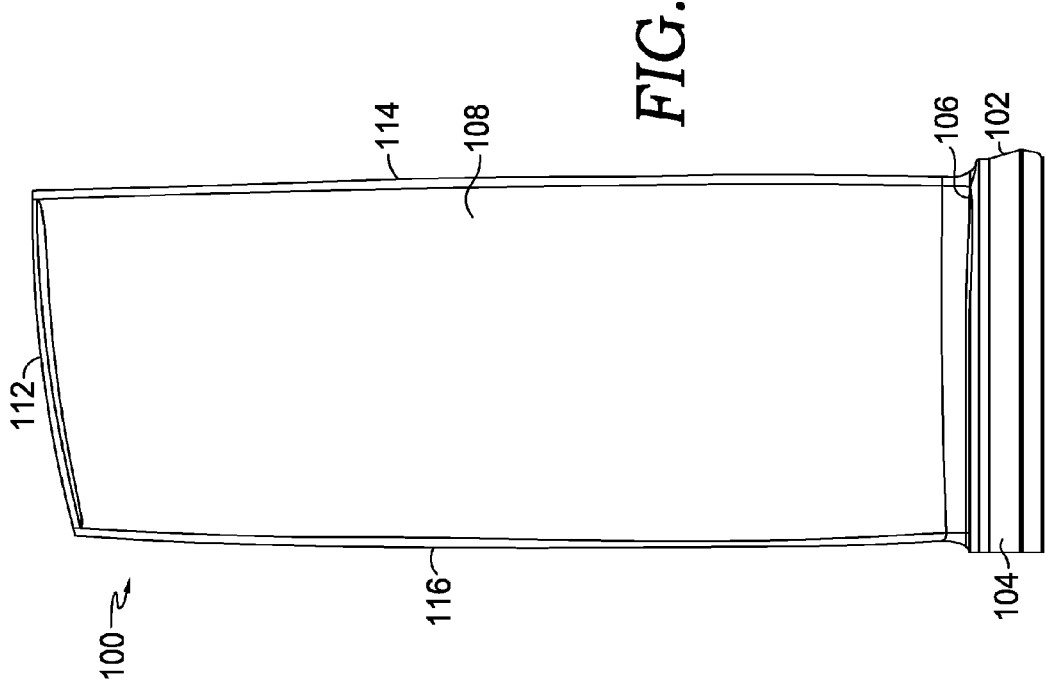
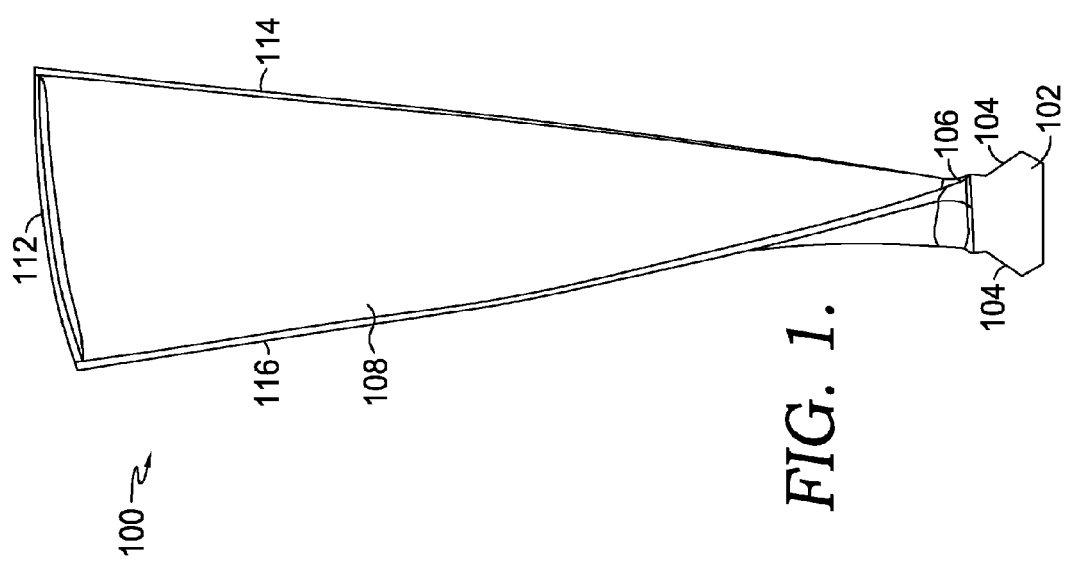

UNFLARED COMPRESSOR BLADE

CROSS-REFERENCE TO RELATED APPLICATIONS

None.

TECHNICAL FIELD

The present invention generally relates to a compressor component having an improved airfoil profile and tip geometry, known as a squealer tip, that addresses vibratory issues and high stress experienced in the airfoil leading edge region while also increasing rub tolerance at the tip.

BACKGROUND OF THE INVENTION

Compressor components having an airfoil, such as a compressor blade, are held within a rotating disk or shaft and are designed to rotate at a high rate of speed in order to compress a fluid passing through, such as air. A compressor typically comprises a plurality of stages, or rotating disks of blades, of diminishing diameter that raise the pressure and temperature, of the working fluid at each stage to a pre-determined level at the compressor exit.

Axial compressors having multiple stages are commonly used in gas turbine engines for increasing the pressure and temperature of air to a pre-determined level at which point fuel can be mixed with the air and the mixture ignited. The hot combustion gases then pass through a turbine to provide either a propulsive output or mechanical output.

Compressor components, such as blades and vanes, are located near an inlet of the engine, and as such, are exposed to impact by foreign objects, dirt, and other debris, that can lead to erosion of the airfoil, especially along its leading edge, and reduced overall efficiency and higher fuel consumption rates. Often times, for increased power output and engine cleaning, operators of gas turbine engines waterwash the compressor, which as one skilled in the art understands is spraying a stream of demineralized water into the compressor inlet at regular cleaning intervals, such as one a day. Alternatively, operators have also installed inlet fogging of the compressor, which inject small droplets of fog into the inlet through special injection nozzle and high pressure pumps. These enhancements, while increasing the power output, can also increase erosion to the airfoil. Significant erosion of the airfoil leading edge can result in the leading edge being a life-limiting factor for the blade. Furthermore, as a blade rotates, it will have a series of vibratory modes that can cause high stress regions depending on the blade geometry. Where high stress regions coincide with other life-limiting factors, such as leading edge erosion, fatigue and failure of the blade are known to occur. When a compressor blade fails, at least the airfoil portion travels downstream through the compressor, damaging subsequent stages of compressor blades and vanes, causing damage significant enough to force an engine shutdown and major repair.

SUMMARY

In accordance with the present invention, there is provided a novel and improved airfoil for a compressor component having a redefined airfoil profile including a reduced thickness portion near the blade tip that results in reduced vibratory stress along the leading edge of the airfoil. The location of the airfoil geometry changes are found along the airfoil chord length and span so as to shift the frequency of the blade with minimal impact to blade aerodynamics. The airfoil is restacked so as to reduce the stress imparted to the airfoil leading edge. The addition of the reduced thickness section at the tip, known as a squealer tip, results in a blade more tolerant of rubs with the casing.

In an embodiment of the present invention, a compressor component having an attachment, a first platform, and an airfoil extending radially outward from the first platform is disclosed. The airfoil has an uncoated profile substantially in accordance with Cartesian coordinate values of X, Y, and Z as set forth in Table 1, carried only to three decimal places, where Y is a distance measured radially from the first platform of the attachment to which the airfoil is mounted.

In an alternate embodiment, an airfoil for a compressor blade is disclosed having an uncoated profile substantially in accordance with Cartesian coordinate values of X, Y, and Z as set forth in Table 1, carried only to three decimal places, where Y is a distance measured in inches and the X and Z values are joined by smooth connecting splines to form a plurality of airfoil sections and the sections are joined to form the airfoil profile.

In yet another embodiment, a compressor is disclosed in which the compressor comprises a compressor disk and a plurality of compressor blades extending radially outward from the compressor disk. The compressor blades each have an airfoil with an uncoated nominal profile substantially in accordance with Cartesian coordinate values of X, Y, and Z in Table 1, with the Y coordinate values at perpendicular distances from planes normal to a radius from a platform of the compressor blade.

The enhancements made to the airfoil along its chord length and span is made so as to not have any impact on the throat area between adjacent blades. As such, a majority of the thickness increase is made to the pressure side, or concave side of the airfoil. Although disclosed as an airfoil that is uncoated, it is envisioned that an alternate embodiment of the present invention can include an airfoil that is at least partially coated with an erosion resistant coating, corrosion resistant coating, or a combination thereof. In this case, the coordinates of the airfoil as listed in Table 1 would be prior to a coating being applied to any portion of the airfoil.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 1 is a front elevation view of a compressor blade having an airfoil in accordance with an embodiment of the present invention;

FIG. 2 is a side elevation view of the compressor blade of FIG. 1;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 4:
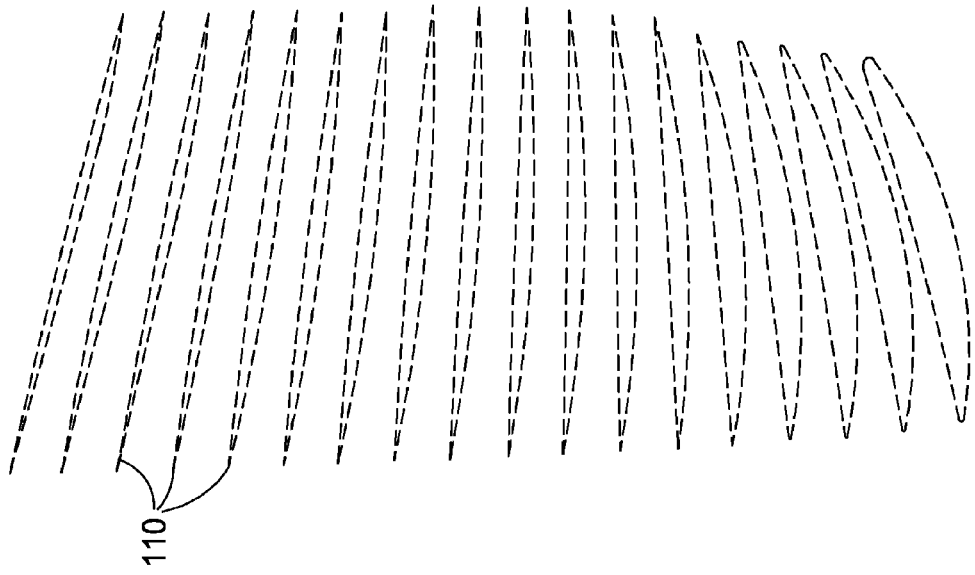
FIG. 4 is a perspective view illustrating a plurality of airfoil sections generated by the Cartesian coordinates of Table 1.
Figure 3:
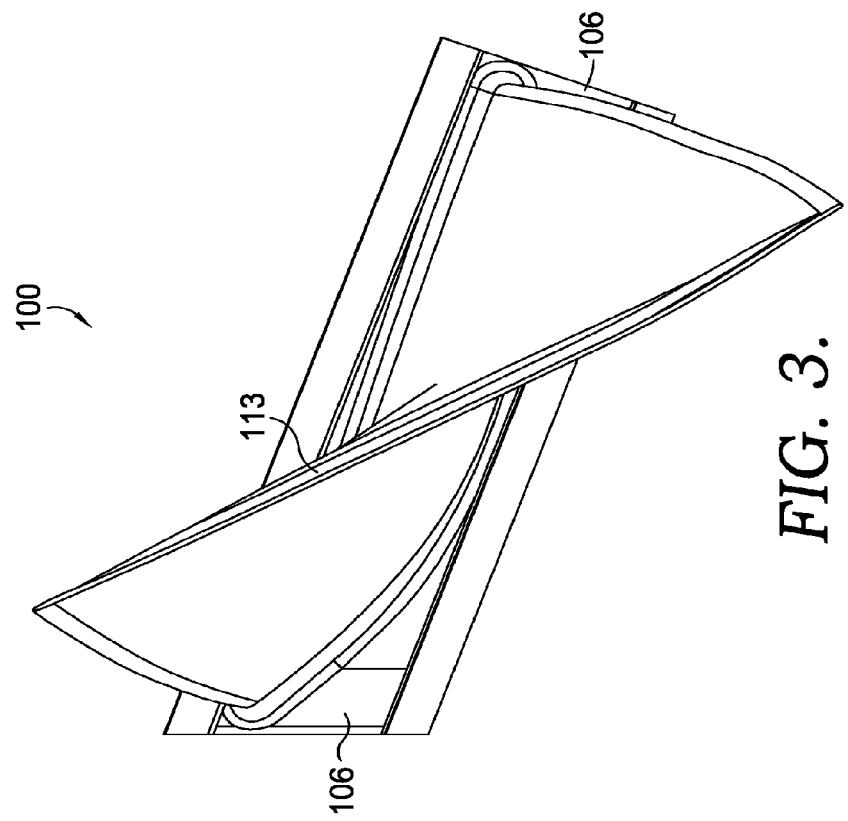
FIG. 3 is a top elevation view of the compressor blade of FIG. 1.

Referring initially to FIGS. 1-3, a compressor blade 100 is shown in accordance with an embodiment of the present invention. The compressor blade 100 comprises an attachment 102, which can also be referred to as a root. The attachment 102 utilizes one or more attachment surfaces 104 that are oriented so as to correspond with a slot in a compressor disk (not depicted) having a matching profile. Such an engagement maintains the blade within the disk, preventing it from moving radially outward due to radial pulling forces associated with the rotation of the compressor disk. For the compressor blade 100, the upper surface of the attachment 102 serves as a platform 106, which aligns with an adjacent surface on an outer diameter of the blade disk to provide a uniform inner wall surface for the incoming air flow to the compressor.

Extending radially outward from the platform 106 is an airfoil 108 having a tip 112. For the compressor blade 100, the airfoil is solid, and fabricated from a material such as a martenestic steel alloy. The airfoil has an uncoated profile substantially in accordance with Cartesian coordinate values of X and Z, for each distance Y, in inches, as set forth in Table 1 below, and carried to three decimal places. The distance Y is measured radially outward from the blade root center plane extending axially through the platform 106. The X and Z coordinates are distances relative to coordinate plane origin established at each of the radial Y heights.

A plurality of airfoil sections 110 are established by applying smooth continuing splines between the X, Z coordinate values in each Y height. Smoothly joining each of the airfoil section 110 together form the profile of the airfoil 108. The airfoil 108 can be fabricated by a variety of manufacturing techniques such as forging, casting, milling, and electrochemical machining (ECM). As such, the airfoil has a series of manufacturing tolerance for the position, profile, twist, and chord that can cause the airfoil 108 to vary by as much as approximately +/−0.012 inches from a nominal state.

The compressor blade 100 is generally fabricated from a steel alloy such as 15-5 PH, which is a precipitation-hardened, martensitic stainless steel alloy that is used on parts requiring corrosion resistance and high strength at temperatures up to approximately 600 deg. F. While other alloys could be used, it is preferred that a high-temperature steel alloy be selected because of the operating conditions. Although the compressor blade has been discussed as having an attachment, at least one platform, and an airfoil, it is to be understood that all of these features of the blade are typically fabricated from the same material and are most likely integral with one another.

In addition to manufacturing tolerances affecting the overall size of the airfoil 108, it is also possible to scale the airfoil 108 to a larger or smaller airfoil size. However, in order to maintain the benefits of this airfoil shape and size, in terms of stiffness and stress, as will be discussed further below, it is necessary to scale the airfoil uniformly in X and Z directions, but Y direction may be scaled separately.

As previously discussed, the profile generated by the X, Y, and Z coordinates of Table 1 is an uncoated profile. While an embodiment of the present invention is an uncoated compressor blade 100, it is possible to add a coating to at least a portion of the airfoil 108 in an alternate embodiment. This coating would have a thickness of up to approximately 0.010 inches. Such coatings can be applied to the airfoil to improve resistance to erosion or to increase temperature capability.

Referring to FIG. 3, positioned at the tip of the blade, opposite of the platform, is a squealer tip 113, which includes a recessed portion so as to minimize the amount of metal located at the blade tip 112. By minimizing the amount of metal, compressor blade 100 can be sized radially to have a tighter fit with the surrounding compressor case such that tolerances can be decreased and efficiency of the compressor increase. Should the squealer tip 113 contact the compressor case and begin to rub the case, the blade will not get as hot due to the smaller amount of material at the blade tip 112.

Depending on the blade configuration, it is possible that a second platform can be positioned at the tip 112 of the airfoil 108. A second platform located at the tip 112, is commonly referred to as a shroud and interlocks with a shroud of an adjacent blade. The shrouds provide an outer airpath seal that increases efficiency by preventing air from passing over the blade tip 112 and also serves to reduce the vibration of the airfoils 108. The use of a second platform, or a shroud, is common in airfoils having a relatively long radial length.

A compressor blade is typically fabricated from a relatively low temperature alloy since air temperature of the compressor only reaches upwards of 700 deg. F. One such material for the compressor blade 100 is a martenestic stainless steel alloy. In an alternate embodiment of the invention, a compressor comprises at least one compressor disk (not depicted) having a plurality of compressor blades 100 that extend radially outward from the compressor disk. As one skilled in the art understands, a compressor typically comprises a plurality of alternating stages of rotating and stationary airfoils that raise the pressure and temperature of a fluid passing through. While the compressor blade 100 having the airfoil 108 can operate in a variety of locations within a compressor, depending on the compressor size, one such location that suits this blade, is adjacent an inlet of the compressor.

For compressor blades in this location, a common durability issue exhibited by prior art blades is erosion of the blade leading edge. The leading edge of the blade (see 114 in FIGS. 1 and 2) is the generally radially extending edge at the forward or upstream end of the blade where the concave and convex surfaces of the airfoil come together. This edge first receives the oncoming air flow, and therefore, is also first impacted by anything entering the compressor. Over time, this leading edge can erode away and weaken the airfoil.

As one skilled in the art understands, as a compressor blade is rotated by a compressor disk, and the weight of the blade pulls radially outward on the disk. However, because of blade design issues such as desired compression of the airflow, blade materials, and compressor size, rarely is the only load a truly radial pulling load. For large unshrouded blades there is usually a substantial amount of blade twist from airfoil root to airfoil tip. Due to the blade's pulling load, the airfoil will tend to untwist or try to straighten itself out. The compression of the airflow also creates load on the airfoil that tries to bend the blade where the airfoil attaches to the platform. Blade pull, untwist, and aero loading result in concentrated steady stress that can occur near the blade's airfoil root leading edge and the blade attachment, as seen with blades of prior art. Airfoil unsteady stress can occur due to the vibratory nature of the blade. Specific vibratory shapes for the blade result in stress concentrations on the airfoil. Blade failure can occur when the blade steady and unsteady stress concentrations occur together. If erosion forms at a location of high steady and unsteady stress then the chance of blade failure is increased.

For a compressor blade that is subject to foreign object damage and erosion, the present invention provides an airfoil that increases the airfoil stiffness so as to alter the natural frequency of the blade away from resonant frequency. The airfoil stiffness has been accomplished by selectively increasing and decreasing the airfoil thickness while maintaining baseline aerodynamic performance. Material has been added to the airfoil from 0% span (adjacent the platform 106) up to approximately 75% span, with material having been removed from this location and radially outward to the tip 112 of the airfoil 108. Adding mass to the lower region of the airfoil 108 has increased the stiffness of the airfoil 108 by making the airfoil 108 less subject to bending. The increase in thickness is generally uniform up to approximately 63% span. The thickness of the leading edge 114 and trailing edge 116 has not been changed. The majority of the thickness has been added along the chord length on the concave, or pressure, side of the airfoil 108.

In order to reduce the stress concentrations found in the attachment of the airfoil and redistribute this stress, the airfoil 108 has been restacked relative to a prior art airfoil. Through restacking the airfoil sections (i.e. altering the tilt or lean of the radial stack of the airfoil sections), a compressive bending stress is imparted at the leading edge and a tensile bending stress on the convex side of the trailing edge at approximately 70% chord (with 0% chord=the airfoil leading edge 114 and 100% chord=the airfoil trailing edge 116). A parabolic bow/lean is applied to the airfoil sections 110 so as to minimize distortion of the airfoil shape, which will minimize bending stresses at the root/attachment. By reducing the stress in the leading edge 114 and applying that stress on the convex side at the trailing edge 116, the stress concentrations have been reduced. Therefore, even if erosion damage occurs to the leading edge 114, the blade 100 has adequate fatigue capability.

Figure 6:
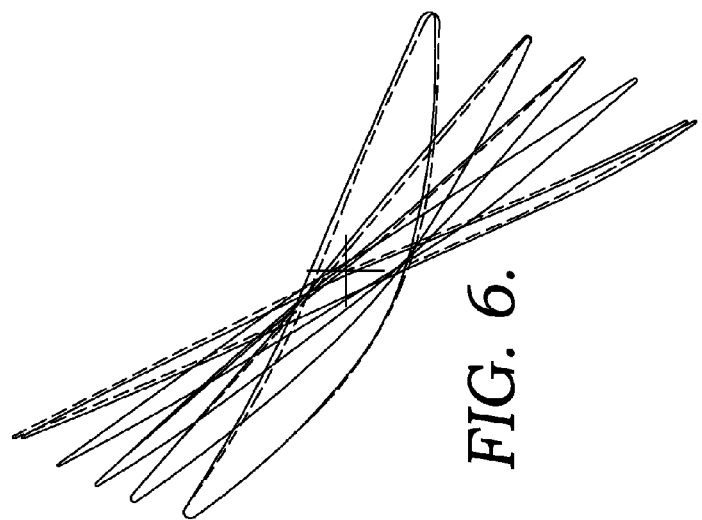
FIG. 6 is a cross section view overlaying a plurality of airfoil sections of the present invention with airfoil sections of the prior art.
Figure 5:
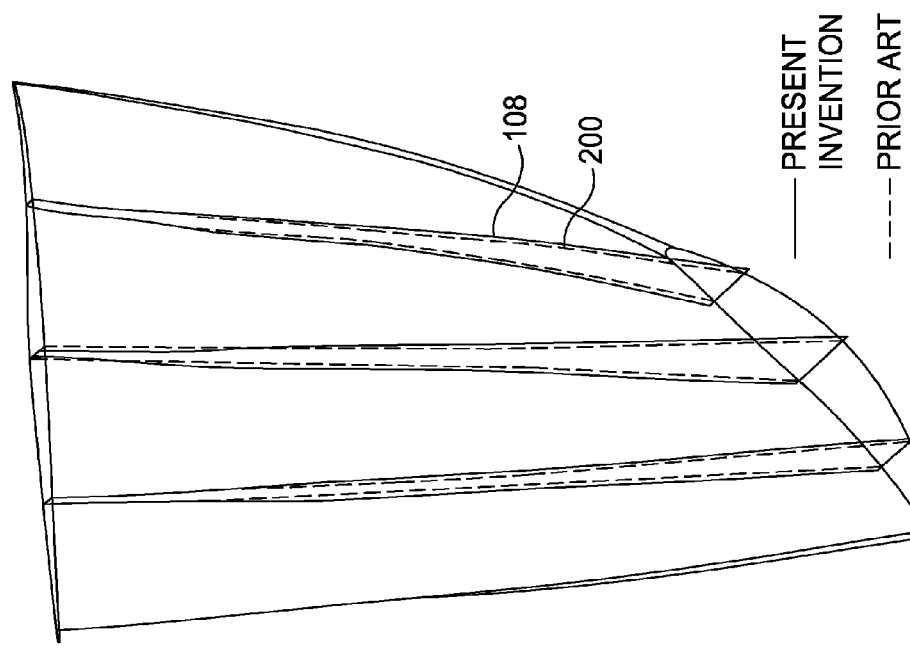
FIG. 5 is a perspective view of a comparison between the airfoil generated by airfoil sections of FIG. 4 and a prior art airfoil.
Figure 9:
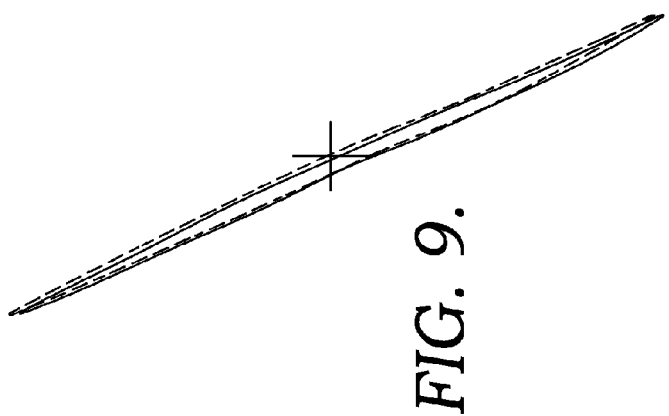
FIGS. 7-9 are enlarged views of various cross sections overlaying the airfoil in accordance with an embodiment of the present invention with an airfoil of the prior art; and, FIG. 10 is a chart depicting a change in airfoil thickness versus percent span of the airfoil.
Figure 8:
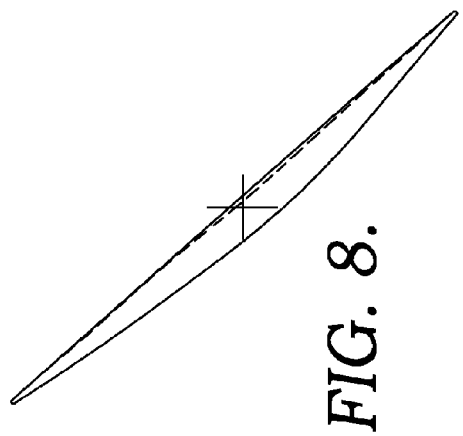
Figure 7:
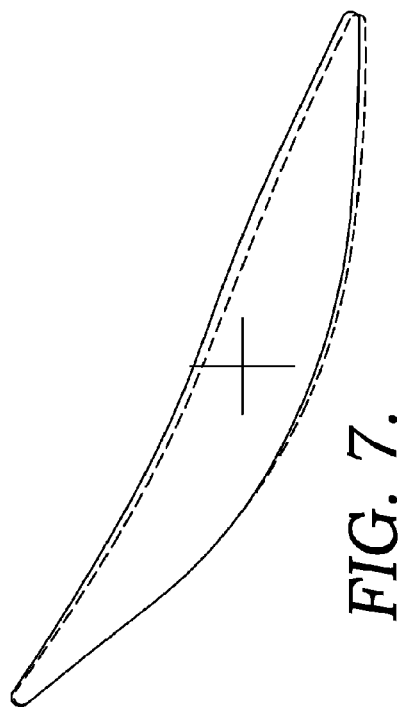

The modifications to the prior art airfoil, in terms of thickness and restacking, can be seen in more detail in FIGS. 5-10. FIG. 5 is a perspective view depicting the present invention airfoil 108 with solid lines compared to the prior art airfoil 200, shown in dashed lines. From FIG. 5 it can be seen where the airfoil 108 has an increased thickness. FIG. 6 depicts a plurality of sections taken through the airfoils 108 and 200 of FIG. 5. Through this overlay of sections, it can also be seen how the airfoil thickness has increased and how the airfoil sections have been restacked to alter the bending stresses. FIGS. 7-9 are enlargements of specific sections depicted in FIG. 6, with FIG. 7 taken at a radial height of approximately Y=1.1, FIG. 8 taken at a radial height of approximately Y=7.7, and FIG. 9 taken at a radial height of approximately Y=16.1.

Figure 10:
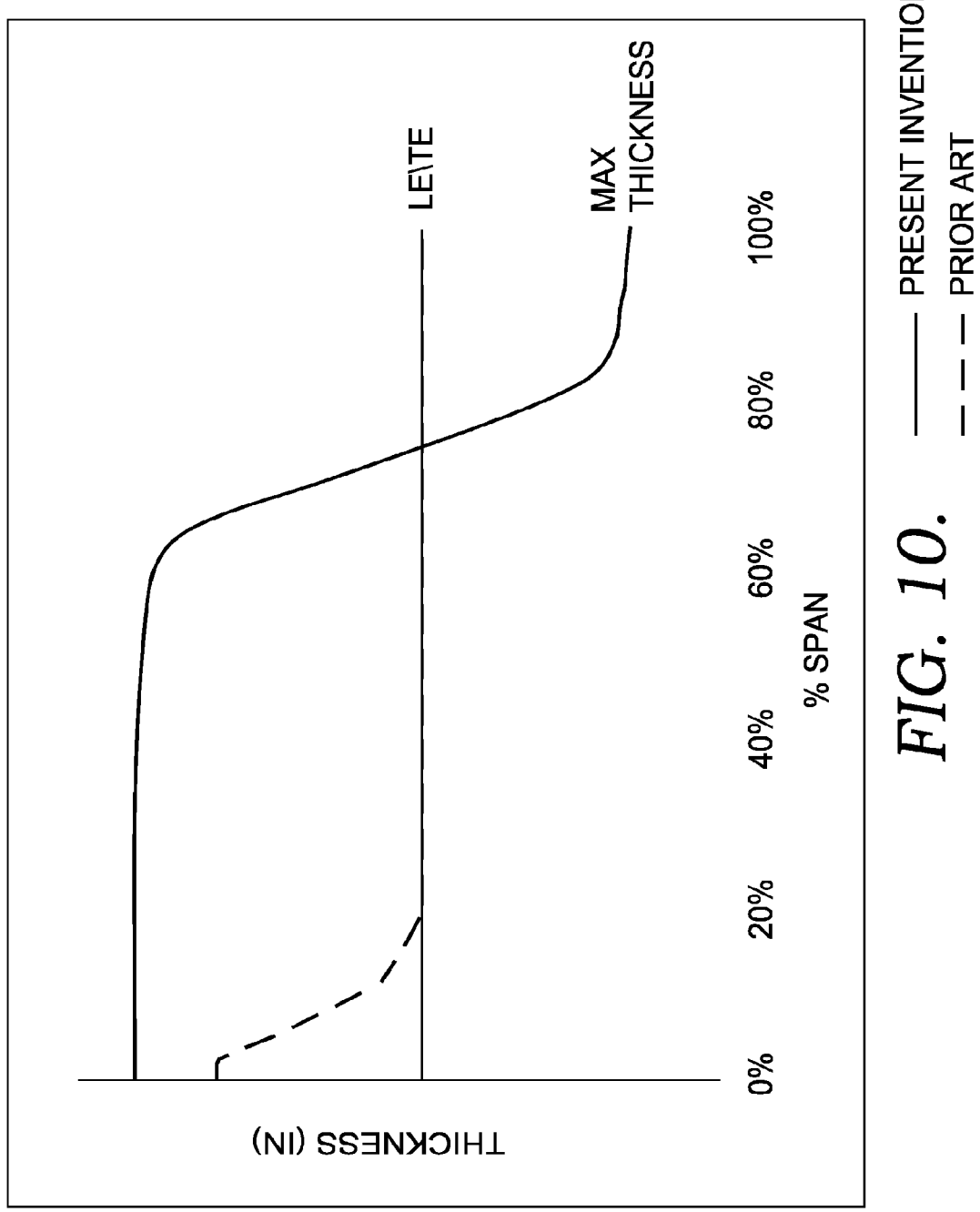

Referring now to FIG. 10, another way to look at how the thickness of the airfoil 108 is changed for stiffening purposes is depicted. This chart shows a view of relative airfoil thickness (in inches) versus percent span. The solid line depicts the thickness increase or decrease over percent span for the airfoil 108 of the present invention. For this embodiment, the thickness of the airfoil is increased until approximately 60% span and then the amount of thickness increase diminishes and starts to decrease in thickness between 70%-80% span through to the blade tip.

---

Lengthy table referenced here

US08596986-20131203-T00001

Please refer to the end of the specification for access instructions.

---

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

---

LENGTHY TABLES

The patent contains a lengthy table section. A copy of the table is available in electronic form from the USPTO web site (http://seqdata.uspto.gov/?pageRequest=docDetail&DocID=US08596986B2). An electronic copy of the table will also be available from the USPTO upon request and payment of the fee set forth in 37 CFR 1.19(b)(3).

---

What is claimed is:

1. A compressor component having an attachment, a first platform extending radially outward from the attachment and an airfoil extending radially outward from the platform, the airfoil having an uncoated profile substantially in accordance with Cartesian coordinate values of X and Z, for each distance Y in inches as set forth in Table 1, carried to three decimal places, wherein Y is a distance measured radially outward from a blade root center plane, the X and Z coordinate values being joined in smooth continuing splines to form airfoil sections and the airfoil sections joined smoothly to form the profile, wherein the airfoil has manufacturing tolerances of approximately +/−0.012 inches.

2. The compressor component of claim 1, wherein the airfoil has a root end and a tip end spaced at opposite the root end.

3. The compressor component of claim 2 further comprising a squealer tip at the tip end.

4. The compressor component of claim 1, wherein the compressor component is a rotating blade.

5. The compressor component of claim 4, wherein the compressor component is located adjacent to inlet guide vanes of a compressor.

6. The compressor component of claim 2, wherein the airfoil is unflared proximate the tip end.

7. The compressor component of claim 1, wherein the airfoil sections can be scaled uniformly.

8. An airfoil for a compressor blade, the airfoil having an uncoated profile substantially in accordance with Cartesian coordinate values of X, Y, and Z as set forth in Table 1, carried to three decimal places, wherein Y is a distance measured in inches radially outward from a blade root center plane, the X and Z coordinate values being joined in smooth continuing splines to form airfoil sections and the airfoil sections joined smoothly to form the profile, wherein the airfoil has manufacturing tolerances of approximately +/−0.012 inches.

9. The airfoil of claim 8, wherein the airfoil has a first end attached to a platform of a compressor blade.

10. The airfoil of claim 9, further comprising a squealer tip positioned at a second end of the airfoil opposite of the first end.

11. The airfoil of claim 8, wherein the airfoil sections can be scaled uniformly.

12. A compressor comprising a compressor disk and a plurality of compressor blades extending radially outward from the compressor disk, each of the plurality of compressor blades having an airfoil with an uncoated nominal profile substantially in accordance with Cartesian coordinate values of X, Y and Z, set forth in inches in Table 1, with the Y coordinate values at perpendicular distances from planes normal to a radius from a blade root center plane, wherein airfoil sections are defined at each distance Y by connecting the X and Z coordinate values with smooth continuing splines, and the airfoil sections are joined smoothly to form the airfoil profile, wherein the airfoil profile is within +/−0.090 inches in a direction normal to the airfoil.

13. The compressor of claim 12, wherein the plurality of compressor blades rotate about an axis of a gas turbine engine.

14. The compressor of claim 12, wherein the plurality of compressor blades each have a squealer tip positioned at a tip end of the airfoil.

15. The compressor of claim 12, wherein the airfoil for each of the plurality of blades is scalable to multiple sizes of gas turbine engines.

* * * * *